US012485669B2

(12) United States Patent
Okamoto

(10) Patent No.: US 12,485,669 B2
(45) Date of Patent: Dec. 2, 2025

(54) HEAD UNIT AND LIQUID EJECTION APPARATUS

(71) Applicant: SEIKO EPSON CORPORATION, Tokyo (JP)

(72) Inventor: Asami Okamoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 147 days.

(21) Appl. No.: 18/611,784

(22) Filed: Mar. 21, 2024

(65) Prior Publication Data

US 2024/0316921 A1 Sep. 26, 2024

(30) Foreign Application Priority Data

Mar. 23, 2023 (JP) ................................ 2023-046390

(51) Int. Cl.

| | |
|---|---|
| ***B41J 2/045*** | (2006.01) |
| ***B41J 2/025*** | (2006.01) |
| ***B41J 2/07*** | (2006.01) |
| ***B41J 2/14*** | (2006.01) |
| *B41J 2/01* | (2006.01) |

(52) U.S. Cl.

CPC ........... *B41J 2/04581* (2013.01); *B41J 2/025* (2013.01); *B41J 2/0451* (2013.01); *B41J 2/04541* (2013.01); *B41J 2/07* (2013.01); *B41J 2/14201* (2013.01); *B41J 2/01* (2013.01); *B41J 2002/14354* (2013.01)

(58) Field of Classification Search

CPC ...... B41J 2/04581; B41J 2/025; B41J 2/0451; B41J 2/04541; B41J 2/07; B41J 2/14201; B41J 2/01; B41J 2002/14354

See application file for complete search history.

(56) References Cited

U.S. PATENT DOCUMENTS

2005/0122360 A1* 6/2005 Sakagami .............. B41J 2/0451 347/19
2015/0158293 A1* 6/2015 Suzuki ................. B41J 2/04541 347/9
2015/0352841 A1* 12/2015 Horie ..................... B41J 2/0451 347/10
2021/0394522 A1* 12/2021 Miyagishi ............ B41J 2/04596

FOREIGN PATENT DOCUMENTS

JP 2005-211873 A 8/2005

* cited by examiner

*Primary Examiner* — Henok D Legesse
(74) *Attorney, Agent, or Firm* — Global IP Counselors, LLP

(57) ABSTRACT

A head unit includes a piezoelectric element displaced according to a driving signal to cause a liquid to be ejected, a driving signal generation unit that generates the driving signal, a residual vibration signal generation circuit that outputs a change in an electromotive force of the piezoelectric element according to residual vibration, in a pressure chamber in communication with a nozzle, that occurs after supply of the driving signal, as a residual vibration signal, an analog differential residual vibration signal generation circuit that converts the residual vibration signal into an analog differential residual vibration signal, a demodulation circuit that demodulates the analog differential residual vibration signal and outputs a demodulated signal, an AD converter that converts the demodulated signal into a digital signal, and a determination unit that determines, based on the digital signal, a state in the pressure chamber.

12 Claims, 9 Drawing Sheets

HEAD UNIT AND LIQUID EJECTION APPARATUS

The present application is based on, and claims priority from JP Application Serial Number 2023-046390, filed Mar. 23, 2023, the disclosure of which is hereby incorporated by reference herein in its entirety.

BACKGROUND

1. Technical Field

The present disclosure relates to a head unit and a liquid ejection apparatus.

2. Related Art

As a method of discriminating a nozzle state of a printing apparatus, a method of detecting residual vibration has been known (see JP-A-2005-211873).

In the technique described in JP-A-2005-211873, when a residual vibration signal as an analog waveform detected in a head is transmitted to a control unit, the residual vibration signal needs to be transmitted from the head to an AD converter. However, in a process of the transmission, noise may be superimposed on the analog waveform of the residual vibration signal.

SUMMARY

To solve the above-described problem, a head unit according to an aspect includes a piezoelectric element displaced according to a driving signal to cause a liquid to be ejected, a driving signal generation unit that generates the driving signal, a residual vibration signal generation circuit that outputs a change in an electromotive force of the piezoelectric element according to residual vibration, in a pressure chamber in communication with a nozzle, that occurs after supply of the driving signal, as a residual vibration signal, an analog differential residual vibration signal generation circuit that converts the residual vibration signal into an analog differential residual vibration signal, a demodulation circuit that demodulates the analog differential residual vibration signal and outputs a demodulated signal, an AD converter that converts the demodulated signal into a digital signal, and a determination unit that determines, based on the digital signal, a state in the pressure chamber.

To solve the above-described problem, a liquid ejection apparatus according to an aspect includes a transport mechanism and a head unit. The head unit includes a piezoelectric element displaced according to a driving signal to cause a liquid to be ejected, a driving signal generation unit that generates the driving signal, a residual vibration signal generation circuit that outputs a change in an electromotive force of the piezoelectric element according to residual vibration, in a pressure chamber in communication with a nozzle, that occurs after supply of the driving signal, as a residual vibration signal, an analog differential residual vibration signal generation circuit that converts the residual vibration signal into an analog differential residual vibration signal, a demodulation circuit that demodulates the analog differential residual vibration signal and outputs a demodulated signal, an AD converter that converts the demodulated signal into a digital signal, and a determination unit that determines, based on the digital signal, a state in the pressure chamber.

DESCRIPTION OF EMBODIMENTS

Hereinafter, an embodiment of the present disclosure will be described with reference to the drawings.

Hereinafter, a liquid ejection apparatus of the embodiment of the present disclosure will be described in detail. The present embodiment is merely an example and should not limit the interpretation of the contents of the present disclosure. Hereinafter, the present embodiment will be described by using an ink jet printer that ejects ink to print an image on recording paper, as an example of a liquid ejection apparatus. Ink is an example of a liquid material. Recording paper is an example of a droplet receiving body.

Figure 1:
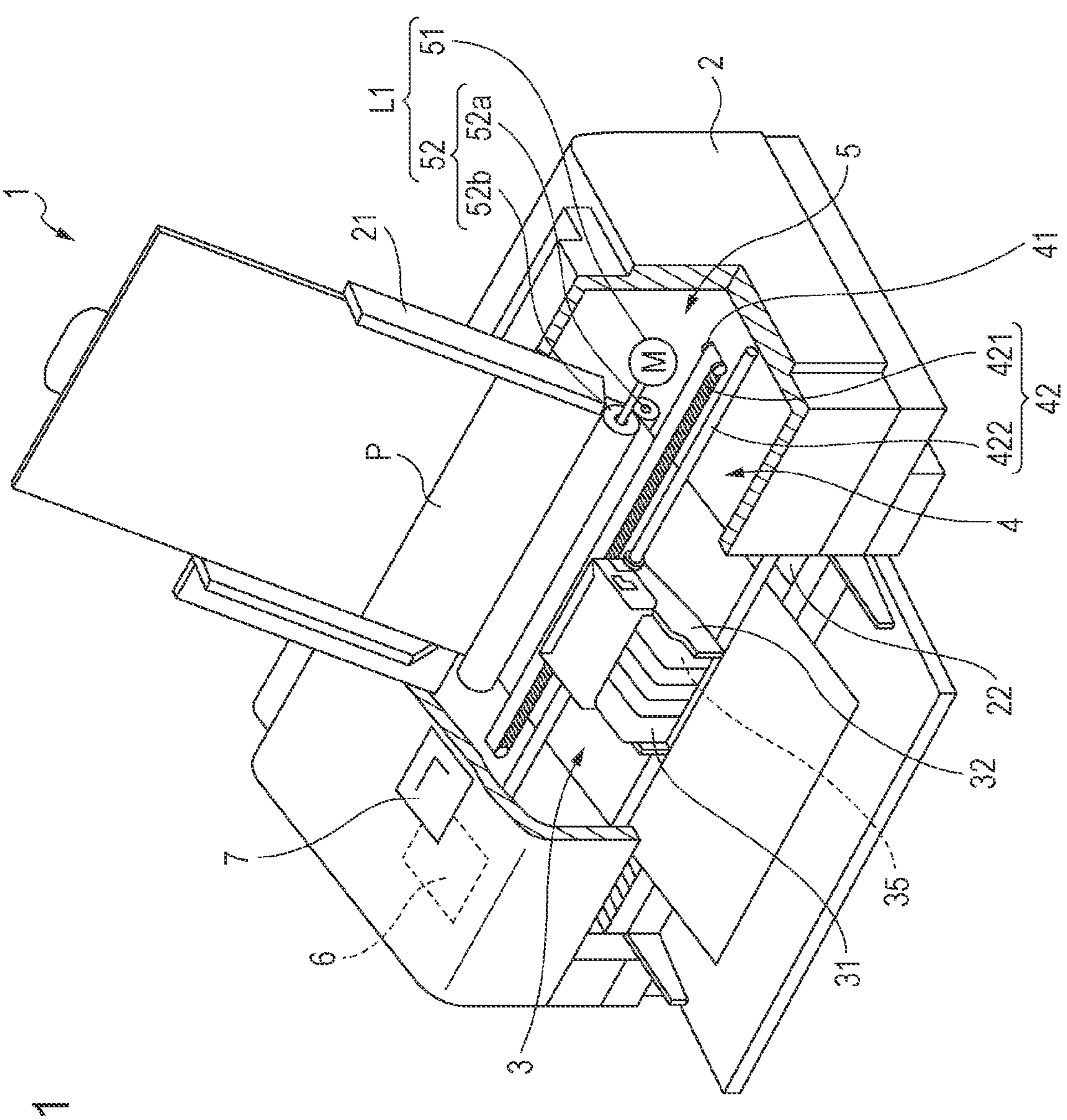
FIG. 1 is a schematic view illustrating a configuration of an ink jet printer, which is a type of a liquid ejection apparatus according to an embodiment.

FIG. 1 is a schematic view illustrating a configuration of an ink jet printer 1, which is a type of a liquid ejection apparatus, in the embodiment. Note that in the following description, in FIG. 1, an upper side is referred to as an upper portion and a lower side is referred to as a lower portion. First, the configuration of the ink jet printer 1 will be described. The ink jet printer 1 illustrated in FIG. 1 includes an apparatus main body 2 and is provided with a tray 21 on which recording paper P is installed on a rear side of an upper portion, a paper discharge port 22 to which the recording paper P is discharged on a front side of a lower portion, and an operation panel 7 on an upper surface.

The operation panel 7 is configured with, for example, a liquid crystal display, an organic electroluminescence (EL) display, a light emitting diode (LED) lamp, or the like and includes a display portion (not illustrated) that displays an error message or the like and an operation portion (not illustrated) configured with various switches. The display portion of the operation panel 7 functions as a notification unit. In addition, the apparatus main body 2 mainly includes thereinside a printing apparatus 4 including a printing unit 3 that is a moving body configured to reciprocate, a paper feeding apparatus 5 that feeds and discharges the recording paper P to and from the printing apparatus 4, and a control unit 6 that controls the printing apparatus 4 and the paper feeding apparatus 5.

The paper feeding apparatus 5 intermittently sends the recording paper P one by one by control of the control unit 6. The recording paper P passes near an area under the printing unit 3. At this time, the printing unit 3 reciprocates in a direction substantially orthogonal to a direction of sending the recording paper P and performs printing on the recording paper P. That is, the reciprocating of the printing unit 3 and the intermittent sending of the recording paper P are main scanning and sub-scanning during printing so as to perform ink jet-type printing.

The printing apparatus 4 includes the printing unit 3, a carriage motor 41 serving as a driving source that causes the printing unit 3 to move such that the printing unit 3 reciprocates in the main scanning direction, and a reciprocating mechanism 42 that causes the printing unit 3 to reciprocate upon receiving rotation of the carriage motor 41. The printing unit 3 includes a plurality of head units 35, ink cartridges (I/C) 31 that supply ink to the respective head units 35, and a carriage 32 on which the head units 35 and the ink cartridges 31 are mounted. Note that in the case of an ink jet printer that consumes a large amount of ink, the ink cartridges 31 may not be mounted on the carriage 32 and may be installed in other locations and configured to be in communication with the head units 35 via tubes so that the ink is supplied (not illustrated).

Note that full color printing is made possible through using of cartridges filled with four colors of ink of yellow, cyan, magenta, and black, as the ink cartridge 31. In this case, the head units 35 corresponding to the respective colors are provided in the printing unit 3. Here, four ink cartridges 31 corresponding to four colors of ink are illustrated in FIG. 1, but the printing unit 3 may be configured to further include the ink cartridges 31 for other colors such as light cyan, light magenta, dark yellow, and special colors, for example.

Figure 2:
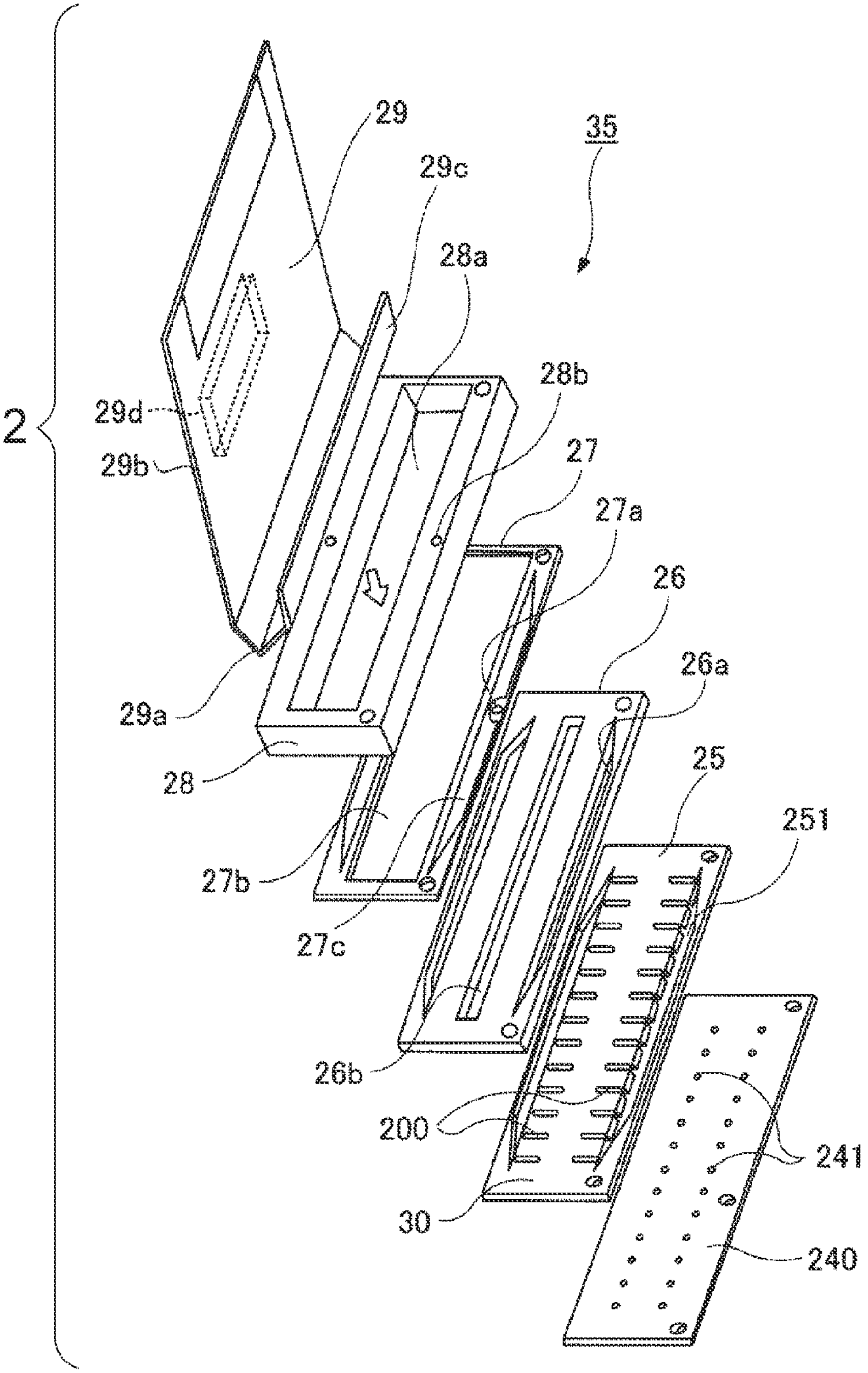
FIG. 2 is an exploded schematic perspective view illustrating a configuration example of a head unit in the ink jet printer illustrated in FIG. 1 according to the embodiment.

FIG. 2 is an exploded schematic perspective view illustrating the configuration of each head unit 35. As illustrated in FIG. 2, the head unit 35 in the embodiment is schematically configured with a nozzle plate 240, a flow channel substrate 25, a common liquid chamber substrate 26, a compliance substrate 27, and the like and is attached to a unit case 28 in a state in which the members described above are laminated.

The nozzle plate 240 is a plate-shaped member in which a plurality of nozzles 241 are arranged in rows at a pitch corresponding to a dot forming density. For example, a nozzle row is formed of three hundred nozzles 241 arranged in rows at a pitch corresponding to 300 dpi. In the embodiment, two nozzle rows are formed in the nozzle plate 240. Here, the two nozzle rows are formed while being shifted by a half of a pitch between the nozzles 241 in a direction in which the nozzles 241 are arranged. The nozzle plate 240 is formed of, for example, a glass ceramic material, a silicon single crystal substrate, stainless steel, or the like.

Figure 4:
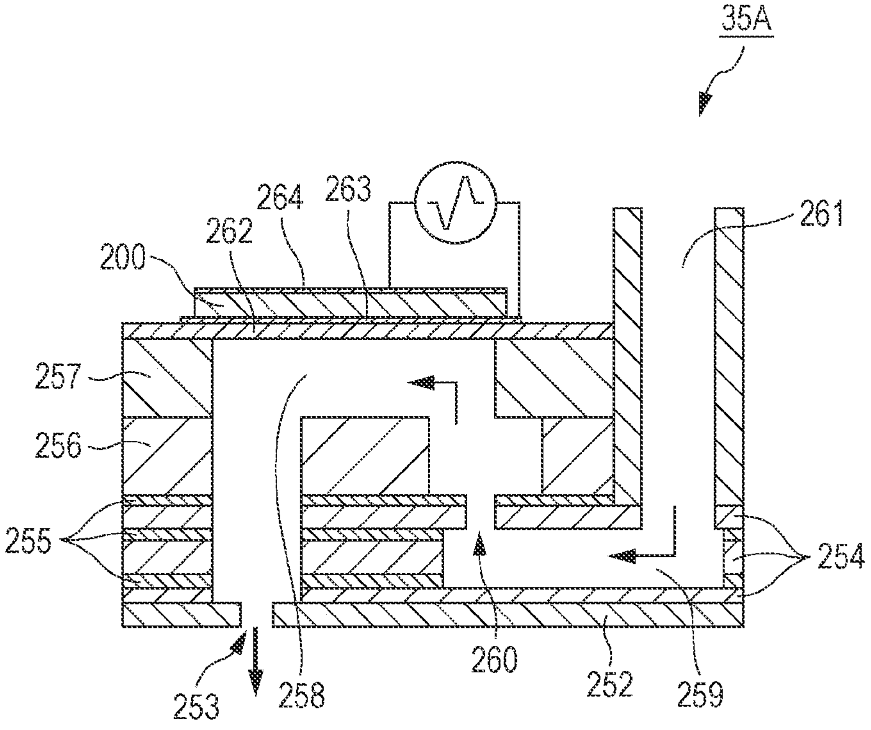
FIG. 4 is a schematic sectional view illustrating an example of the head unit in the ink jet printer illustrated in FIG. 1 according to the embodiment.

The flow channel substrate 25 is formed through thermal oxidation of a very thin elastic film 30 made of silicon dioxide on a surface on a common liquid chamber substrate 26 side, which is an upper surface of the flow channel substrate 25. In the flow channel substrate 25, a plurality of cavities 258, which are defined by a plurality of partition walls by an anisotropic etching process, are formed correspondingly to the respective nozzles 241. The cavities 258 are illustrated in FIG. 4. Therefore, the cavities 258 are also formed in rows and are shifted by a half of a pitch between the nozzles 241 in the direction in which the nozzles 241 are arranged. A communication hollow portion 251 is formed outside a row of the cavities 258 in the flow channel substrate 25. The communication hollow portion 251 is in communication with the cavities 258.

In addition, for each cavity 258 in the flow channel substrate 25, a piezoelectric element 200 for deforming the elastic film 30 to pressurize ink in the cavity 258 is formed.

On the flow channel substrate 25 in which the piezoelectric element 200 is formed, the common liquid chamber substrate 26 having a penetrating hollow portion 26*a* that penetrates the common liquid chamber substrate 26 in a thickness direction is disposed. Examples of the material of the common liquid chamber substrate 26 include glass, a ceramic material, metal, resin, or the like, and for example, the common liquid chamber substrate 26 may be formed of a material having substantially the same thermal expansion coefficient as the flow channel substrate 25. For example, the common liquid chamber substrate 26 may be formed by using a silicon single crystal substrate made of the same material as the material of the flow channel substrate 25 made of a silicon single crystal substrate.

In addition, the penetrating hollow portion 26*a* in the common liquid chamber substrate 26 is in communication with the communication hollow portion 251 of the flow channel substrate 25. In addition, in the common liquid chamber substrate 26, a wiring hollow portion 26*b* that penetrates the common liquid chamber substrate 26 in a substrate thickness direction is formed between the adjacent piezoelectric element rows. In addition, on an upper surface side of the common liquid chamber substrate 26, the compliance substrate 27 is disposed. In a region in the compliance substrate 27 facing the penetrating hollow portion 26*a* of the common liquid chamber substrate 26, an ink inlet 27*a* for supplying ink from an ink introduction needle side to a common liquid chamber is formed and penetrates the compliance substrate 27 in a thickness direction. In addition, a region other than the ink inlet 27*a*, in the region of the compliance substrate 27 facing the penetrating hollow portion 26*a*, and a penetrating port 27*b* is a flexible portion 27*c* that is formed very thin, and the flexible portion 27*c* seals an opening of the penetrating hollow portion 26*a* on an upper portion side so as to define and form the common liquid chamber. In addition, the flexible portion 27*c* functions as a compliance portion that absorbs pressure fluctuation of ink in the common liquid chamber. Moreover, the penetrating port 27*b* is formed in a central portion of the compliance substrate 27. The penetrating port 27*b* is in communication with a hollow portion 28*a* of the unit case 28.

The unit case 28 is a member in which an ink introduction path 28*b* that is in communication with the ink inlet 27*a* and supplies ink introduced from the ink introduction needle side to a common liquid chamber side is formed, and in which a recessed portion that allows expansion of the flexible portion 27*c* is formed in a region facing the flexible portion 27*c*. In a central portion of the unit case 28, the hollow portion 28*a* that penetrates the unit case 28 in a thickness direction is provided, and one end side of a flexible cable 29 is inserted into the hollow portion 28*a* in an insertion direction indicated by the void arrow, coupled to a terminal led out from the piezoelectric element 200, and fixed by an adhesive. Examples of the material of the unit case 28 include, for example, a metal material such as stainless steel.

In the flexible cable 29, a control integrated circuit (IC) 29*d* for controlling application of a driving voltage to the piezoelectric element 200 is mounted on one surface of a rectangular base film made of polyimide or the like, and a pattern of individual electrode wiring to be coupled to the control IC 29*d* is also formed. In addition, one end portion of the flexible cable 29 is provided with a plurality of rows of coupling terminals (not illustrated) corresponding respective external electrodes led out from the piezoelectric element 200, and another end portion is provided with a plurality of rows of another terminal side coupling terminals to be coupled to a substrate terminal portion of a substrate that relays a signal from a main body side of the ink jet printer 1. In addition, in the flexible cable 29, wiring patterns other than the coupling terminals at each end portion and a surface of the control IC 29*d* are covered with a resist. The external electrodes correspond to a lower electrode 263 and an upper electrode 264 illustrated in FIG. 4.

One end side 29*a* of the flexible cable 29 coupled to the external electrodes is folded so as to project. More specifically, the flexible cable 29 is folded from a main body 29*b* of the flexible cable 29 and formed into a mountain shape so that a leading end of the one end side 29*a* becomes a ridgeline, and an end 29*c* is folded back in a reverse direction of the insertion direction of the flexible cable 29.

The nozzle plate 240, the flow channel substrate 25, the common liquid chamber substrate 26, the compliance substrate 27, and the unit case 28 are mutually joined by being heated while being laminated with an adhesive, a thermal welding film, or the like interposed therebetween.

The description will be returned to FIG. 1. The reciprocating mechanism 42 includes a carriage guide shaft 422 each end of which is supported by a frame (not illustrated), and a timing belt 421 that extends in parallel to the carriage guide shaft 422. The carriage 32 is supported by the carriage guide shaft 422 of the reciprocating mechanism 42 so as to freely reciprocate and is also fixed to a part of the timing belt 421.

When the timing belt 421 is caused to travel normally or reversely via a pulley by operation of the carriage motor 41, the printing unit 3 is guided by the carriage guide shaft 422 and reciprocates. In addition, when the printing unit 3 reciprocates, ink droplets are appropriately ejected from respective ink jet heads 100 of the head units 35 correspondingly to image data to be printed, and printing is performed on the recording paper P. Note that the image data may be called printing data or the like.

The paper feeding apparatus 5 has a paper feeding motor 51 serving as a driving source of the paper feeding apparatus 5, and a paper feeding roller 52 that rotates by operation of the paper feeding motor 51. The paper feeding roller 52 is composed of a driven roller 52*a* and a driving roller 52*b* that face each other in an up-down direction with a transport path of the recording paper P interposed therebetween and pinch the recording paper P, and the driving roller 52*b* is coupled to the paper feeding motor 51. As a result, the paper feeding roller 52 is configured to send many sheets of the recording paper P installed on the tray 21 one by one toward the printing apparatus 4 or discharge the recording paper P one by one from the printing apparatus 4. Note that in place of the tray 21, a configuration in which a paper feeding cassette that stores the recording paper P can be detachably attached may be adopted. Moreover, the paper feeding motor 51 also sends the recording paper P according to the image resolution interlocking with the reciprocating operation of the printing unit 3. The paper feeding operation and the paper sending operation can be performed by respective separate motors or alternatively can be performed by the same motor with a component such as an electromagnetic clutch that switches torque transmission. In the present embodiment, the paper feeding motor 51 and the paper feeding roller 52 constitute a transport mechanism L1.

The control unit 6 performs printing processing on the recording paper P by controlling the printing apparatus 4, the paper feeding apparatus 5, and the like based on, for example, printing data input from a host computer 8 such as a personal computer, or a digital camera. In addition, the control unit 6 displays an error message or the like in the display portion of the operation panel 7, or turns on or blinks an LED lamp or the like, and at the same time, causes each unit to perform corresponding processing based on a signal generated by pressing of various switches input from the operation portion. Moreover, the control unit 6 transfers an error message or information on abnormal ejection or the like to the host computer 8 where necessary. The host computer 8 is illustrated in FIG. 3.

Figure 3:
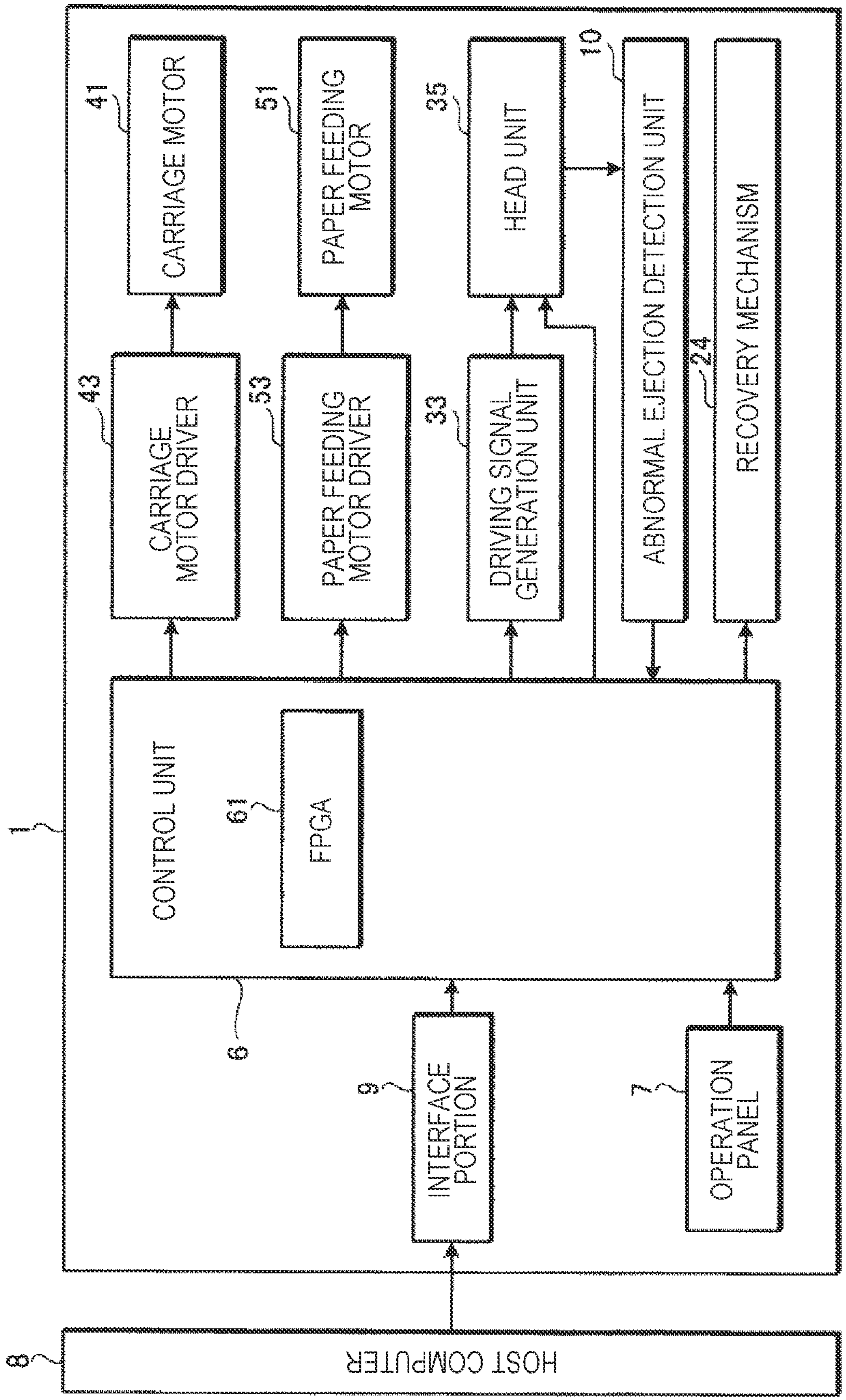
FIG. 3 is a block diagram schematically illustrating a main portion of the ink jet printer according to the embodiment.

FIG. 3 is a block diagram schematically illustrating a main portion of the ink jet printer of the present disclosure. In FIG. 3, the ink jet printer 1 of the present disclosure includes an interface portion 9 that receives printing data or the like input from the host computer 8, the control unit 6, the carriage motor 41, a carriage motor driver 43 that drives and controls the carriage motor 41, the paper feeding motor 51, a paper feeding motor driver 53 that drives and controls the paper feeding motor 51, the head unit 35, a driving signal generation unit 33 that drives and controls the head unit 35, an abnormal ejection detection unit 10, a recovery mechanism 24, and the operation panel 7. The recovery mechanism 24 is a mechanism that recovers a function so that the head unit 35 normally operates when ink droplets cannot be ejected from the head unit 35. Specifically, the recovery mechanism 24 performs flushing operation and wiping operation. The flushing operation is head cleaning operation in which ink droplets are ejected from all or target nozzles 241 of the head unit 35 when a cap is attached to the head unit 35 or at a location where ink droplets do not splash on the recording paper. In addition, during the wiping operation, substances such as paper dust or dust adhering to a head surface is wiped off by a wiper to clean a nozzle plate. At this time, the inside of the nozzles 241 may have a negative pressure and suck ink of other colors. Therefore, after the wiping operation, a fixed amount of ink droplets is ejected from all the nozzles 241 of the head unit 35 so that the flushing operation is performed. Note that the details of the abnormal ejection detection unit 10 and the driving signal generation unit 33 will be described later.

In FIG. 3, the control unit 6 includes a field programmable gate array (FPGA) 61. The FPGA 61 performs various kinds of processing such as printing processing and abnormal ejection detection processing. Note that the control unit 6 may include, in place of the FPGA 61, a central processing unit (CPU) and a storage unit composed of a nonvolatile semiconductor memory or the like.

As described above, the printing unit 3 includes the plurality of head units 35 corresponding to the respective colors of ink. In addition, each head unit 35 includes the plurality of nozzles 241 and the piezoelectric elements 200 corresponding to the respective nozzles 241. That is, the head unit 35 includes the plurality of ink jet heads 100 having a pair of the nozzle 241 and the piezoelectric element 200. The respective ink jet heads 100 are a droplet ejection head.

In addition, to the control unit 6, although not illustrated, for example, various sensors that can detect the ink remaining amount of the ink cartridge 31, the position of the printing unit 3, and the printing environment such as the temperature and humidity are electrically coupled. The control unit 6 acquires printing data from the host computer 8 via the interface portion 9 and then stores the printing data in the FPGA 61. Then, the FPGA 61 performs predetermined processing on the printing data, and based on the processing data and input data from the various sensors, outputs control signals to the driving signal generation unit 33, each of the carriage motor driver 43 and the paper feeding motor driver 53, and the head unit 35. When the control signals are input via the carriage motor driver 43 and the paper feeding motor driver 53, the carriage motor 41 of the printing apparatus 4 and the paper feeding motor 51 of the paper feeding apparatus 5 each operate. As a result, printing processing is performed on the recording paper P.

Figures 5A, 5B, 5C:
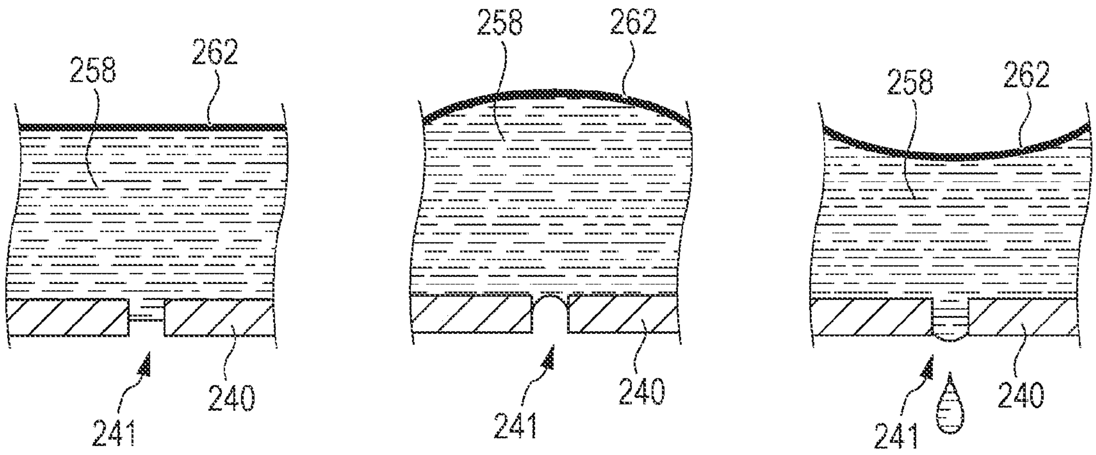
FIGS. 5A to 5C are state diagrams illustrating respective states of the head unit according to the embodiment when a driving signal is input.

Next, a structure of each head unit 35 will be described. FIG. 4 is a schematic sectional view of the head unit 35 illustrated in FIG. 1. A head unit 35A illustrated in FIG. 4 corresponds to the ink jet head 100. In addition, the head unit 35A corresponds to the head unit 35 illustrated in FIG. 3. According to the configuration portion illustrated in FIG. 4, an ejection portion W1 is configured. FIGS. 5A to 5C are plan views illustrating an example of a nozzle surface of the printing unit 3 in which the head unit 35A illustrated in FIG. 4 is adopted. Note that a nozzle plate 252 and a nozzle 253 illustrated in FIG. 4 correspond to the nozzle plate 240 and the nozzle 241 in the examples of FIG. 2 and FIGS. 5A to 5C, respectively.

In the head unit 35A illustrated in FIG. 4, a vibration plate 262 vibrates by driving of the piezoelectric element 200, and ink, which is a liquid, in the cavity 258 is ejected from the nozzle 253. A metal plate 254 made of stainless steel is bonded via an adhesive film 255 to the nozzle plate 252 made of stainless steel through which the nozzle 253, which is a hole, is formed, and the similar metal plate 254 made of stainless steel is bonded via the adhesive film 255 further thereon. In addition, a communication port formation plate 256 and a cavity plate 257 are sequentially bonded further thereon.

The nozzle plate 252, the metal plate 254, the adhesive film 255, the communication port formation plate 256, and the cavity plate 257 are each formed into a predetermined shape and are overlapped to form the cavity 258 and a reservoir 259. The predetermined shape is a shape that forms a recessed portion. The cavity 258 and the reservoir 259 are in communication with each other via an ink supply port 260. In addition, the reservoir 259 is in communication with an ink intake port 261.

The vibration plate 262 is installed on an upper surface opening portion of the cavity plate 257, and the piezoelectric element 200 is bonded to the vibration plate 262 with the lower electrode 263 interposed therebetween. In addition, the upper electrode 264 is bonded on a side of the piezoelectric element 200 opposite from the lower electrode 263. The driving signal generation unit 33 applies and supplies a driving voltage waveform between the upper electrode 264 and the lower electrode 263, so that the piezoelectric element 200 vibrates and the vibration plate 262 bonded thereto vibrates. The vibration of the vibration plate 262 changes the volume of the cavity 258, the pressure in the cavity 258 changes, and ink, which is a liquid filling the inside of the cavity 258, is ejected as droplets from the nozzle 253. That is, the piezoelectric element 200 is displaced according to a driving signal and causes a liquid to be ejected.

The liquid is replenished by the amount that is reduced in the cavity 258 due to ejection of droplets when ink is supplied from the reservoir 259. In addition, ink is supplied from the ink intake port 261 to the reservoir 259.

Next, ejection of ink droplets will be described with reference to FIGS. 5A to 5C. FIGS. 5A to 5C are state diagrams illustrating respective states of the head unit according to the embodiment when a driving signal is input. When a driving voltage is applied from the driving signal generation unit 33 to the piezoelectric element 200 illustrated in FIG. 4, a mechanical power such as expansion and contraction or a warp may occur in the piezoelectric element 200. Therefore, the vibration plate 262 is bent in an up direction in FIG. 4 with respect to an initial state illustrated in FIG. 5A, and as illustrated in FIG. 5B, the volume of the cavity 258 expands. In this state, when the driving voltage is changed by control of the driving signal generation unit 33, the vibration plate 262 is restored by an elastic restoring force thereof, moves further in a down direction than is the position of the vibration plate 262 in the initial state, and the volume of the cavity 258 is suddenly contracted as illustrated in FIG. 5C. At this time, by a compression pressure generated in the cavity 258, part of ink, which is a liquid material, filling the cavity 258 is ejected as ink droplets from the nozzle 253 that is in communication with the cavity 258.

The vibration plate 262 of each cavity 258 performs attenuation vibration by ink ejection operation by a driving signal of the driving signal generation unit 33, which is a series of the actions described above, until a driving voltage is input by the next driving signal so that ink droplets are ejected again. Hereinafter, the attenuation vibration is also referred to as residual vibration. The residual vibration of the vibration plate 262 is assumed to have a natural vibration frequency determined by the shapes of the nozzle 253 and the ink supply port 260, or acoustic resistance r according to ink viscosity or the like, inertance m according to an ink weight in a flow channel, and compliance Cm of the vibration plate 262.

Figure 6:
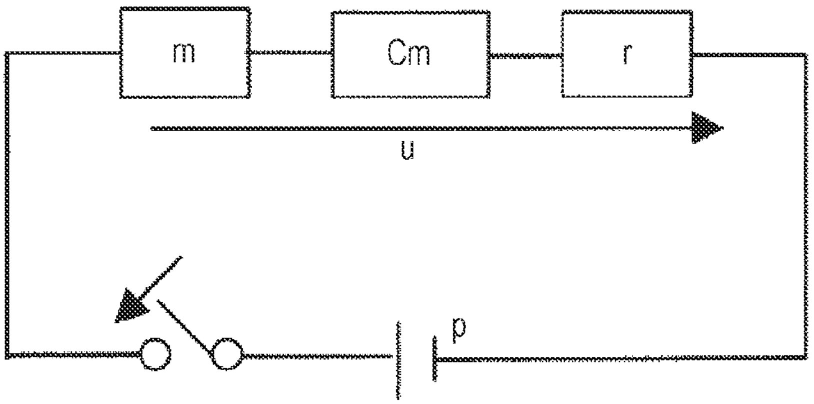
FIG. 6 is a circuit diagram illustrating a calculation model of simple vibration, assuming residual vibration of a vibration plate in FIG. 4 according to the embodiment.

A calculation model of the residual vibration of the vibration plate 262 based on the above-described assumption will be described. FIG. 6 is a circuit diagram illustrating a calculation model of simple vibration, assuming the residual vibration of the vibration plate 262. In this manner, the calculation model of the residual vibration of the vibration plate 262 can be expressed by a sound pressure p, the inertance m, the compliance Cm, and the acoustic resistance r described above. In addition, when a step response, in a case in which the sound pressure p is applied to the circuit in FIG. 6, is calculated for a volume speed u, the following formulae are obtained.

$$U=\{p/(\omega\cdot m)\}e^{-\omega t}\cdot\sin\omega t$$

$$\omega=\{1/(m\cdot Cm)\}-\alpha^2\}^{1/2}$$

$$\alpha=r/2m$$

Figure 7:
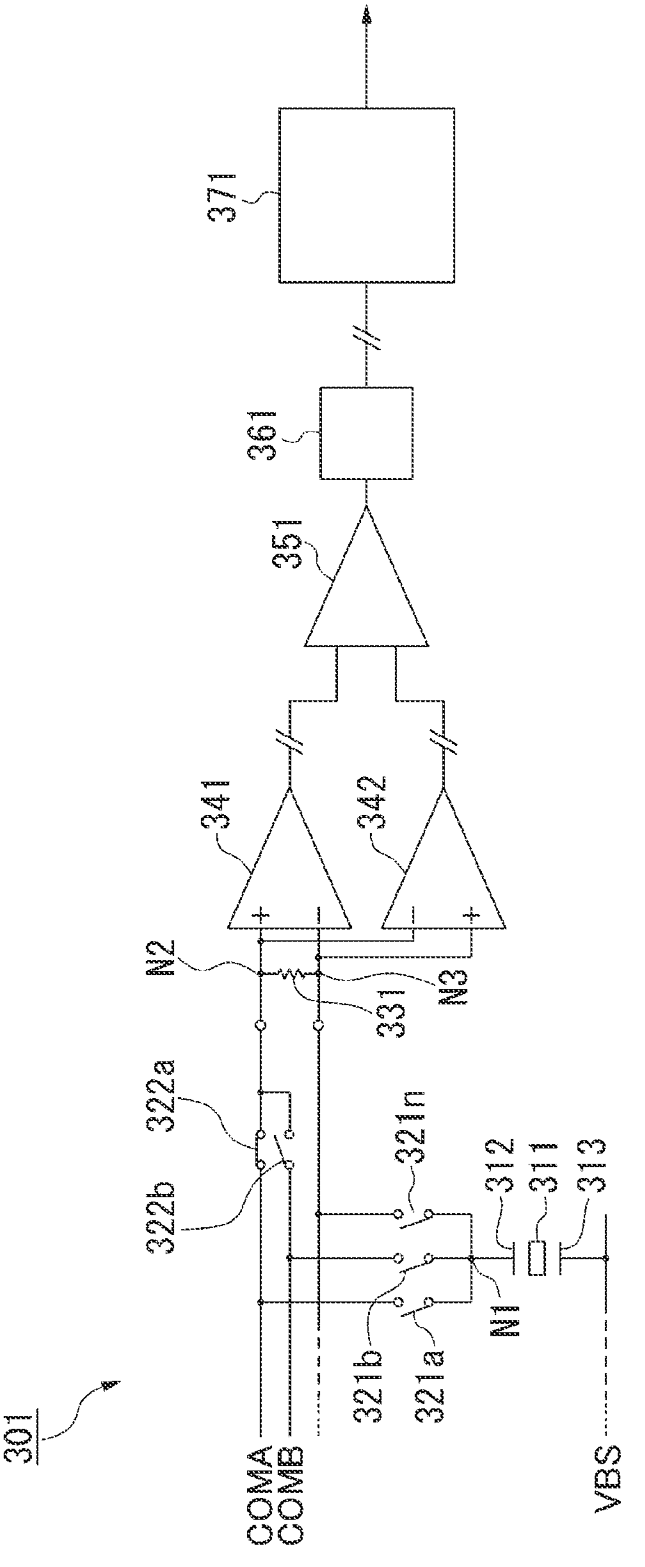
FIG. 7 is a diagram illustrating an example of a circuit of the head unit having a residual vibration detection unit according to the embodiment.

FIG. 7 is a diagram illustrating an example of a configuration of a circuit of a first head unit 301 according to the present embodiment. The first head unit 301 has a function of detecting residual vibration.

The first head unit 301 includes a first piezoelectric element 311, an upper electrode 312, and a lower electrode 313. The first piezoelectric element 311 corresponds to the piezoelectric element 200 illustrated in FIG. 4. The upper electrode 312 and the lower electrode 313 are disposed on and below the first piezoelectric element 311, respectively. The upper electrode 312 and the lower electrode 313 are each in contact with the first piezoelectric element 311. The upper electrode 312 is coupled to the driving signal generation unit 33. The lower electrode 313 is coupled to a constant voltage signal generation circuit (not illustrated). The constant voltage signal generation circuit generates and supplies a signal having a constant voltage. The constant voltage corresponds to a fixed voltage VBS.

Here, in the present embodiment, a configuration in which a driving signal COMA and a driving signal COMB each having a different waveform, as a driving signal, can be switched and used is illustrated, but the number of driving signals that can be switched is not particularly limited. For example, one kind of driving signal may be used. That is, in the present embodiment, two switches of a driving switch 321*a* and a driving switch 321*b* are illustrated, but one of the driving switch 321*a* and the driving switch 321*b* may be used. In addition, in another example, three kinds of driving switches may be used.

One end of the driving switch 321*a* is coupled to a terminal of the driving signal COMA. One end of the driving switch 321*b* is coupled to a terminal of the driving signal COMB. Another end of the driving switch 321*a*, another end of the driving switch 321*b*, one end of a detection switch 321*n*, and the upper electrode 312 are electrically coupled in a first node N1.

One end of a bias switch 322*a* is coupled to a terminal of the driving signal COMA. One end of a bias switch 322*b* is coupled to a terminal of the driving signal COMB. Another end of the detection switch 321*n*, one end of a detection resistance 331, a negative input terminal of a first amplifier 341, and a positive input terminal of a second amplifier 342 are electrically coupled in a third node N3. Another end of the detection resistance 331, another end of the bias switch 322*a*, another end of the bias switch 322*b*, a positive input terminal of the first amplifier 341, and a negative input terminal of the second amplifier 342 are electrically coupled in a second node N2.

The driving switch 321*a* switches a coupling state of the driving signal COMA and the first node N1 between ON and OFF. The driving switch 321*b* switches a coupling state of the driving signal COMB and the first node N1 between ON and OFF. The driving switch 321*a* and the driving switch 321*b* are switches used to selectively apply the driving signal COMA and the driving signal COMB to the first node N1, respectively. Here, two driving signals of the driving signal COMA and the driving signal COMB are generated by the driving signal generation unit 33 illustrated in FIG. 3. The driving signal generation unit 33 is controlled by the control unit 6.

The first head unit 301 includes the detection switch 321*n*. The detection switch 321*n* switches a coupling state of the first node N1 and the third node N3 and a coupling state of the first node N1 and the second node N2 between ON and OFF. The detection switch 321*n* is a switch that switches the coupling state of the first node N1 and the third node N3 between ON and OFF so as to switch between a state in which a residual vibration signal can be supplied to a residual vibration signal generation circuit and a state in which a residual vibration signal cannot be supplied to the residual vibration signal generation circuit. Here, the driving switch 321*a*, the driving switch 321*b*, and the detection switch 321*n* are controlled by the control unit 6 illustrated in FIG. 3.

Here, the driving switch 321*a*, the driving switch 321*b*, and the detection switch 321*n* may be configured by using a transmission gate (TG), for example. Note that the transmission gate includes a P channel transistor and an N channel transistor that are coupled in parallel, for example, but may be configured with a transistor of either one of the channels.

The first head unit 301 includes the bias switch 322*a* and the bias switch 322*b* corresponding to the driving signal COMA and the driving signal COMB, respectively.

Here, the bias switch 322*a* and the bias switch 322*b* correspond to the driving switch 321*a* and the driving switch 321*b*, respectively. When one of the driving switch 321*a* and the driving switch 321*b* is not included, corresponding one of the bias switch 322*a* and the bias switch 322*b* is not included in the same manner.

The bias switch 322*a* switches a coupling state of the second node N2 and the driving signal COMA between ON and OFF. The bias switch 322*b* switches a coupling state of the second node N2 and the driving signal COMB between ON and OFF. The bias switch 322*a* and the bias switch 322*b* are switches to selectively apply the driving signal COMA and the driving signal COMB to the second node N2, respectively. Here, the bias switch 322*a* and the bias switch 322*b* are controlled by the control unit 6 illustrated in FIG. 3.

Here, the bias switch 322*a* and the bias switch 322*b* may be configured by using, for example, a transmission gate.

The first head unit 301 includes a residual vibration signal generation circuit, an analog differential residual vibration signal generation circuit, a demodulation circuit 351, an AD converter 361, and an FPGA 371. The residual vibration signal generation circuit includes the upper electrode 312, the detection switch 321*n*, and the detection resistance 331. The residual vibration signal generation circuit outputs a change in an electromotive force of the first piezoelectric element 311 according to the residual vibration, in a pressure chamber in communication with a nozzle, that occurs after a driving signal is supplied, as a residual vibration signal. That is, the residual vibration signal generation circuit acquires a waveform of the residual vibration signal. The residual vibration signal is acquired as an analog signal. Note that the residual vibration signal generation circuit may be called a residual vibration detection unit that outputs the residual vibration signal as a waveform of an analog signal. The pressure chamber is the cavity 258 illustrated in FIG. 4.

The detection resistance 331 functions as a bias resistance that supplies a voltage of the driving signal COMA or the driving signal COMB. When at least one of the coupling state of the second node N2 and the driving signal COMA and the coupling state of the second node N2 and the driving signal COMB is turned ON by corresponding one of the bias switch 322*a* and the bias switch 322*b*, and the coupling state of the first node N1 and the third node N3 is turned ON by the detection switch 321*n*, a potential difference is generated by the residual vibration between both ends of the detection resistance 331. In the first head unit 301, the potential difference, a delay time of the residual vibration, and a cycle of the residual vibration are detected so that the state of the nozzle is discriminated.

The analog differential residual vibration signal generation circuit converts the residual vibration signal output by the residual vibration signal generation circuit into an analog differential residual vibration signal. The residual vibration signal, whose waveform is acquired by the residual vibration signal generation circuit, is amplified as a differential signal by the analog differential residual vibration signal generation circuit. The differential signal is also referred to as an analog differential residual vibration signal.

The analog differential residual vibration signal generation circuit includes the first amplifier 341 and the second amplifier 342. In the present embodiment, as an example, the first amplifier 341 and the second amplifier 342 are each a discrete component. Therefore, in the present embodiment, as an example, the analog differential residual vibration signal generation circuit is composed of discrete components. The first amplifier 341 and the second amplifier 342 are each disposed at a different position on a head substrate.

The first amplifier 341 outputs a first signal that is obtained through amplifying of a residual vibration signal. The second amplifier 342 outputs a second signal that is obtained through inverting of the residual vibration signal that is amplified with the same magnification as the first amplifier 341. The first signal and the second signal have reverse polarities and equal amplitudes. Therefore, the first signal and the second signal constitute an analog differential residual vibration signal. In the present embodiment, as an example, the first amplifier 341 and the second amplifier 342 are each configured with a negative feedback type amplifier using an operational amplifier, and the amplitude of an output signal can be adjusted by a variable resistor that divides the voltage of the output signal.

The first signal output from the first amplifier 341 and the second signal output from the second amplifier 342 are each input into the demodulation circuit 351. That is, the analog differential residual vibration signal generated by the analog differential residual vibration signal generation circuit is input into the demodulation circuit 351.

The demodulation circuit 351 demodulates the first signal input from the first amplifier 341 and the second signal input from the second amplifier 342 and outputs a demodulated signal. That is, the demodulation circuit 351 demodulates an analog differential residual vibration signal and outputs a demodulated signal. The demodulated signal is an analog signal. Note that the waveform of the demodulated signal and the waveform of the residual vibration signal are the same, as an example. The demodulation circuit 351 includes a differential input amplifier, as an example. The demodulation circuit 351 suppresses or removes noise while amplifying the analog differential residual vibration signal.

The demodulated signal that is demodulated by the demodulation circuit 351 is input into the AD converter 361. The AD converter 361 converts the demodulated signal output from the demodulation circuit 351 into a digital signal. The AD converter 361 outputs the converted digital signal to the FPGA 371. The FPGA 371 determines the state in the pressure chamber based on the digital signal output from the AD converter 361. The FPGA 371 corresponds to the FPGA 61 illustrated in FIG. 3. The FPGA 371 is an example of a determination unit.

Here, in the present embodiment, a driving signal for testing is applied to the first piezoelectric element 311 during the printing operation, and residual vibration, which is a pressure change in the cavity 258 that occurs due to the application of the driving signal, is detected as a change in an electromotive force of the first piezoelectric element 311 by the residual vibration signal generation circuit. Based on a control signal output from the control unit 6, the driving signal generation unit 33 supplies the driving signal for testing to the first piezoelectric element 311. On the other hand, the control unit 6 supplies the electromotive force of the first piezoelectric element 311 to the residual vibration signal generation circuit when the residual vibration is detected. The residual vibration signal generation circuit outputs a signal that indicates a change in the electromotive force of the first piezoelectric element 311 as a residual vibration signal.

In the example of FIG. 7, detailed illustration is omitted, but the first head unit 301 includes a plurality of piezoelectric element portions corresponding to a plurality of respective nozzles. Each of the piezoelectric element portions are composed of one or more piezoelectric elements. In the example of FIG. 7, a case in which the first piezoelectric element 311, which is one piezoelectric element, is used as the piezoelectric element portion is illustrated, but the configuration is not limited thereto. For example, a combination of a plurality of piezoelectric elements can be used as the piezoelectric element portion.

Here, the AD converter 361 is mounted on a driving substrate 503. The first amplifier 341 and the second amplifier 342 as the residual vibration signal generation circuit are mounted on a head substrate 501. In the first head unit 301, the residual vibration signal acquired by the residual vibration signal generation circuit is converted into an analog differential residual vibration signal by the analog differential residual vibration signal generation circuit, and transmitted to the AD converter 361 via the demodulation circuit 351. That is, in the first head unit 301, the distance between the head substrate 501 and the driving substrate 503 is greater than a predetermined distance. In the first head unit 301, differential transmission is used to transmit a residual vibration signal from the residual vibration signal generation circuit to the AD converter 361. In the first head unit 301, noise immunity is enhanced by the differential transmission.

As described above, the demodulated signal that is input from the demodulation circuit 351 into the AD converter 361 is an analog signal. Therefore, the demodulation circuit 351 and the AD converter 361 are preferably disposed as close to each other as possible.

Figure 8:
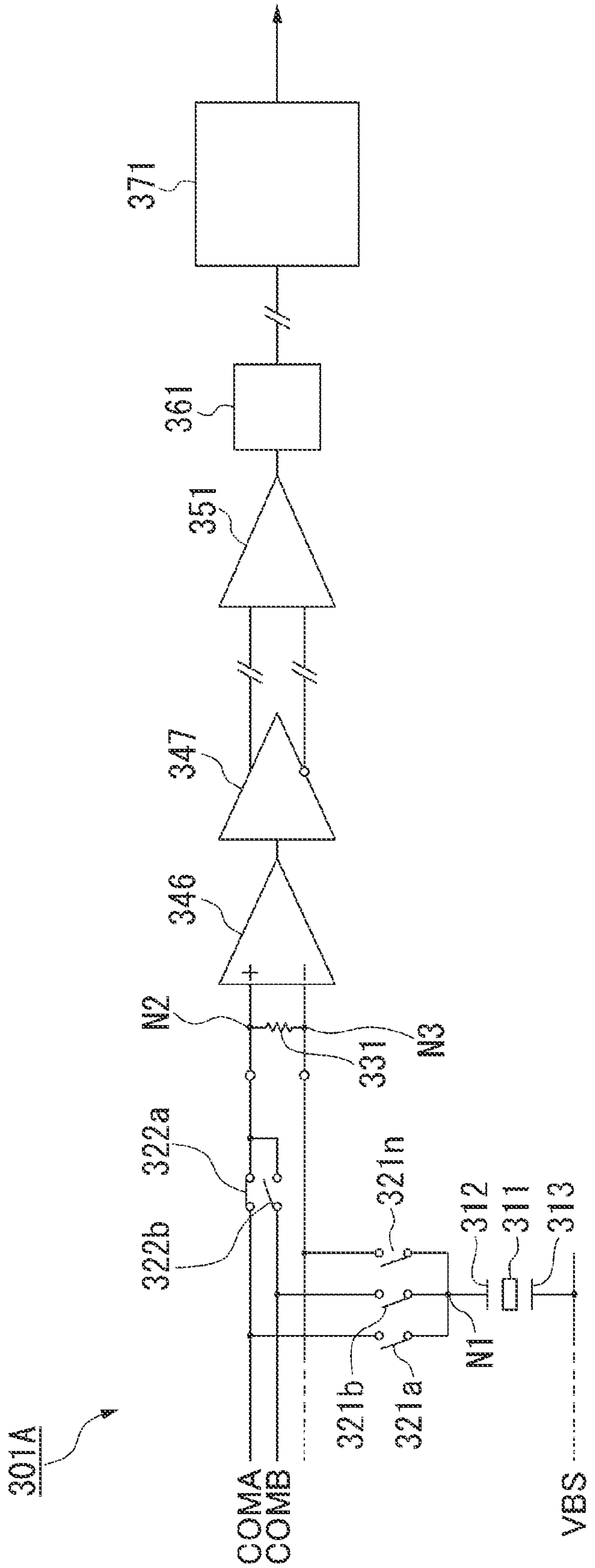
FIG. 8 is a diagram illustrating another example of the circuit of the head unit having a residual vibration detection unit according to the embodiment.

Here, with reference to FIG. 8, another configuration of the first head unit will be described. A first A head unit 301A illustrated in FIG. 8 includes a residual vibration signal generation circuit, an analog differential residual vibration signal generation circuit, the demodulation circuit 351, the AD converter 361, and the FPGA 371. When the first A head unit 301A illustrated in FIG. 8 is compared with the first head unit 301 illustrated in FIG. 7, the configuration of the residual vibration signal generation circuit is different.

In the first A head unit 301A, the analog differential residual vibration signal generation circuit includes an amplifier 346 and a differential output unit 347. As an example, the amplifier 346 and the differential output unit 347 are each mounted as a portion of a single IC component. As an example, the amplifier 346 is an operational amplifier as an IC component. The differential output unit 347 is a differential output amplifier as an IC component. Therefore, in the first A head unit 301A, the analog differential residual vibration signal generation circuit is composed of IC components. In the analog differential residual vibration signal generation circuit that is composed of IC components, the size of the circuit can be reduced compared to a case in which the analog differential residual vibration signal generation circuit is composed of discrete components.

A positive input terminal of the amplifier 346 is electrically coupled to the second node N2. A negative input terminal of the amplifier 346 is electrically coupled to the third node N3. The amplifier 346 amplifies a residual vibration signal. The differential output unit 347 generates an analog differential residual vibration signal from the residual vibration signal amplified by the amplifier 346 and outputs the analog differential residual vibration signal. That is, the differential output unit 347 outputs the first signal and the second signal that are obtained through amplifying of the residual vibration signal. The first signal and the second signal output from the differential output unit 347 are each input into the demodulation circuit 351.

Figure 9:
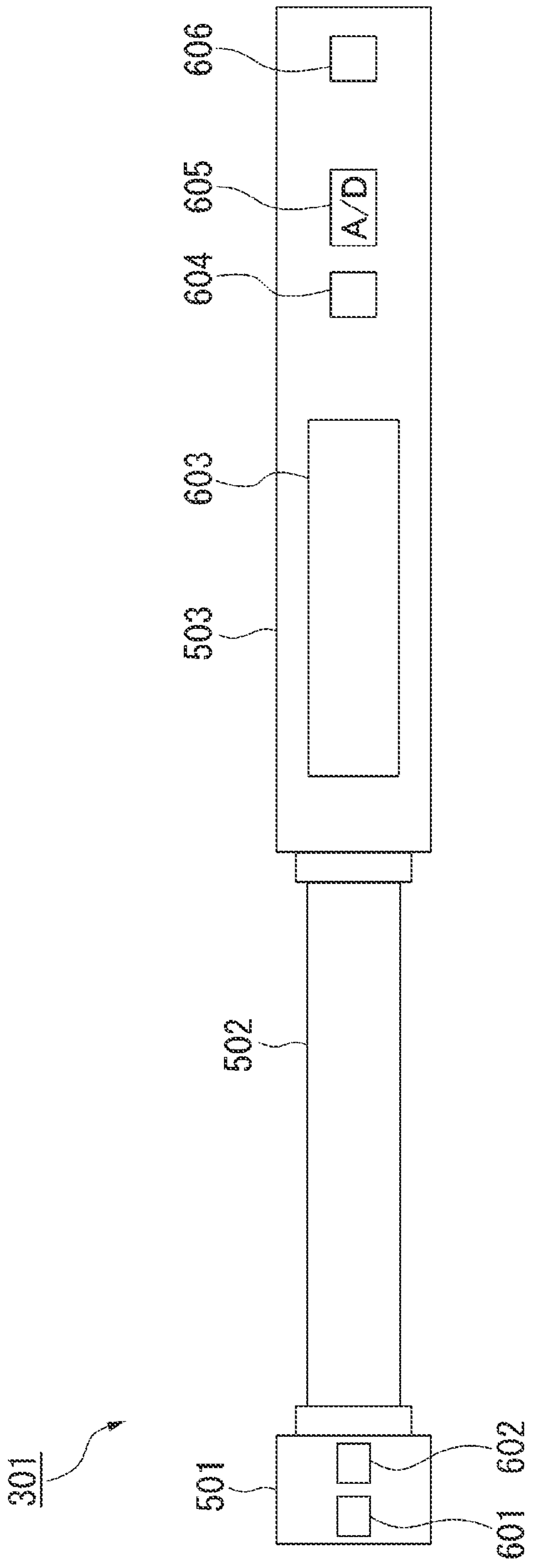
FIG. 9 is a diagram illustrating an example of a configuration of a substrate of the head unit having a residual vibration detection unit according to the embodiment.

Next, with reference to FIG. 9, the configuration of a substrate of the first head unit 301 will be described. FIG. 9 is a schematic view illustrating an example of the configuration of a substrate of the first head unit 301 according to the present embodiment.

The first head unit 301 includes the head substrate 501, an extension cable 502, and the driving substrate 503. The head substrate 501 and the driving substrate 503 are coupled via the extension cable 502.

A residual vibration signal generation circuit 601 and an analog differential residual vibration signal generation circuit 602 are mounted on the head substrate 501. The residual vibration signal generation circuit 601 is disposed further on a piezoelectric element 200 side than is the analog differential residual vibration signal generation circuit 602.

A driving circuit 603, a demodulation circuit 604, an AD converter 605, and an FPGA 606 are mounted on the driving substrate 503. The driving circuit 603, the demodulation circuit 604, the AD converter 605, and the FPGA 606 are disposed at positions close to the head substrate 501 in this order on the driving substrate 503.

The head substrate 501 is an example of a first substrate on which the analog differential residual vibration signal generation circuit is mounted. The driving substrate 503 is an example of a second substrate on which the demodulation circuit is mounted. The first substrate and the second substrate are configured as different substrates.

The residual vibration signal generation circuit 601 illustrated in FIG. 9 corresponds to the residual vibration signal generation circuit illustrated in FIG. 7. That is, the residual vibration signal generation circuit 601 corresponds to the upper electrode 312, the detection switch 321*n*, and the detection resistance 331. The analog differential residual vibration signal generation circuit 602 illustrated in FIG. 9 corresponds to the analog differential residual vibration signal generation circuit illustrated in FIG. 7. That is, the analog differential residual vibration signal generation circuit 602 corresponds to the first amplifier 341 and the second amplifier 342. Note that the analog differential residual vibration signal generation circuit 602 may correspond to the analog differential residual vibration signal generation circuit illustrated in FIG. 8. In this case, the analog differential residual vibration signal generation circuit 602 corresponds to the amplifier 346 and the differential output unit 347. The driving circuit 603 illustrated in FIG. 9 corresponds to the driving signal generation unit 33 illustrated in FIG. 3. The demodulation circuit 604, the AD converter 605, and the FPGA 606 illustrated in FIG. 9 correspond to the demodulation circuit 351, the AD converter 361, and the FPGA 371 illustrated in FIG. 7, respectively.

The residual vibration signal generation circuit 601 and the AD converter 605 are mounted on different substrates, which are the head substrate 501 and the driving substrate 503, respectively. Therefore, the distance from the residual vibration signal generation circuit 601 to the AD converter 605 is longer than that in a case in which the residual vibration signal generation circuit 601 and the AD converter 605 are mounted on the same substrate.

Moreover, in the first head unit 301, the head substrate 501 and the driving substrate 503 are coupled via the extension cable 502. Therefore, the distance between the residual vibration signal generation circuit 601 to the AD converter 605 is made long at least by the length of the extension cable 502.

In addition, as illustrated in FIG. 9, in the driving substrate 503, the driving circuit 603 is mounted on a side closer to the head substrate 501 than is the AD converter 605. That is, the driving circuit 603 is mounted between the residual vibration signal generation circuit 601 and the AD converter 605. The distance from residual vibration signal generation circuit 601 to the AD converter 605 is made long at least by the size of the driving circuit 603.

Therefore, in the first head unit 301, the residual vibration signal, which is an analog signal, needs to be transmitted by the distance from the residual vibration signal generation circuit 601 to the AD converter 605. In the first head unit 301, as described above, the residual vibration signal is converted into an analog differential residual vibration signal and transmitted from the analog differential residual vibration signal generation circuit 602 to the demodulation circuit 604. Therefore, in the first head unit 301, the noise immunity can be enhanced during transmission of the residual vibration signal.

Note that the analog differential residual vibration signal generation circuit 602 and the demodulation circuit 604 may be mounted on the same substrate.

In addition, the AD converter 605 may be mounted on a substrate different from the driving substrate 503. However, as in the present embodiment, when the AD converter 605 is mounted on the driving substrate 503 on which the demodulation circuit 604 is mounted, the distance between the demodulation circuit 604 and the AD converter 605 can be made shorter. The shorter the distance is, the shorter the distance, in which the analog signal demodulated by the demodulation circuit 604 is transmitted from the demodulation circuit 604 to the AD converter 605, is, whereby the noise immunity can be enhanced during transmission of the residual vibration signal.

In addition, the residual vibration signal generation circuit 601 may be mounted on a substrate different from the head substrate 501. However, as in the present embodiment, when the residual vibration signal generation circuit 601 is mounted on the head substrate 501 on which the analog differential residual vibration signal generation circuit 602 is mounted, the distance between the residual vibration signal generation circuit 601 and the analog differential residual vibration signal generation circuit 602 can be made shorter. The shorter the distance is, the shorter the distance, in which the residual vibration signal detected by the residual vibration signal generation circuit 601 is transmitted from the residual vibration signal generation circuit 601 to the analog differential residual vibration signal generation circuit 602, is, whereby the noise immunity can be enhanced during transmission of the residual vibration signal.

As described above, the head unit according to the present embodiment includes a piezoelectric element, the driving signal generation unit 33, a residual vibration signal generation circuit, an analog differential residual vibration signal generation circuit, a demodulation circuit, an AD converter, and a determination unit. The piezoelectric element is displaced according to a driving signal to cause a liquid to be ejected. The driving signal generation unit 33 generates the driving signal. The residual vibration signal generation circuit outputs a change in an electromotive force of the piezoelectric element according to residual vibration, in a pressure chamber in communication with a nozzle, that occurs after supply of the driving signal, as a residual vibration signal. The analog differential residual vibration signal generation circuit converts the residual vibration signal into an analog differential residual vibration signal. The demodulation circuit demodulates the analog differential residual vibration signal and outputs a demodulated signal. The AD converter converts the demodulated signal into a digital signal. The determination unit determines, based on the digital signal, a state in the pressure chamber.

In the present embodiment, the head unit 35 or the first head unit 301 is an example of the head unit. In the present embodiment, the driving signal COMA and the driving signal COMB are examples of the driving signal. In the present embodiment, the piezoelectric element 200 or the first piezoelectric element 311 is an example of the piezoelectric element. In the present embodiment, the cavity 258 is an example of the pressure chamber. In the present embodiment, the upper electrode 312, the detection switch 321*n*, and the detection resistance 331, or the residual vibration signal generation circuit 601 is an example of the residual vibration signal generation circuit. In the present embodiment, the first amplifier 341 and the second amplifier 342, the amplifier 346 and the differential output unit 347, or the analog differential residual vibration signal generation circuit 602 is an example of the analog differential residual vibration signal generation circuit. In the present embodiment, the demodulation circuit 351 or the demodulation circuit 604 is an example of the demodulation circuit. In the present embodiment, the AD converter 361 or the AD converter 605 is an example of the AD converter. In the present embodiment, the FPGA 61, the FPGA 371, or the FPGA 606 is an example of the determination unit.

According to this configuration, in the head unit (the first head unit 301 in the present embodiment) according to the present embodiment, a residual vibration signal, which is an analog signal, is transmitted by differential transmission, and noise superimposition during transmission can be removed by demodulation before the residual vibration signal is input into the AD converter 361. That is, in the head unit according to the present embodiment, through differentially transmitting of the residual vibration signal, the noise immunity can be enhanced. Therefore, in the head unit according to the present embodiment, the detection accuracy of residual vibration can be enhanced. In the head unit according to the present embodiment, for example, a four-direction ground (GND) guard ring is not necessary.

Figure 10:
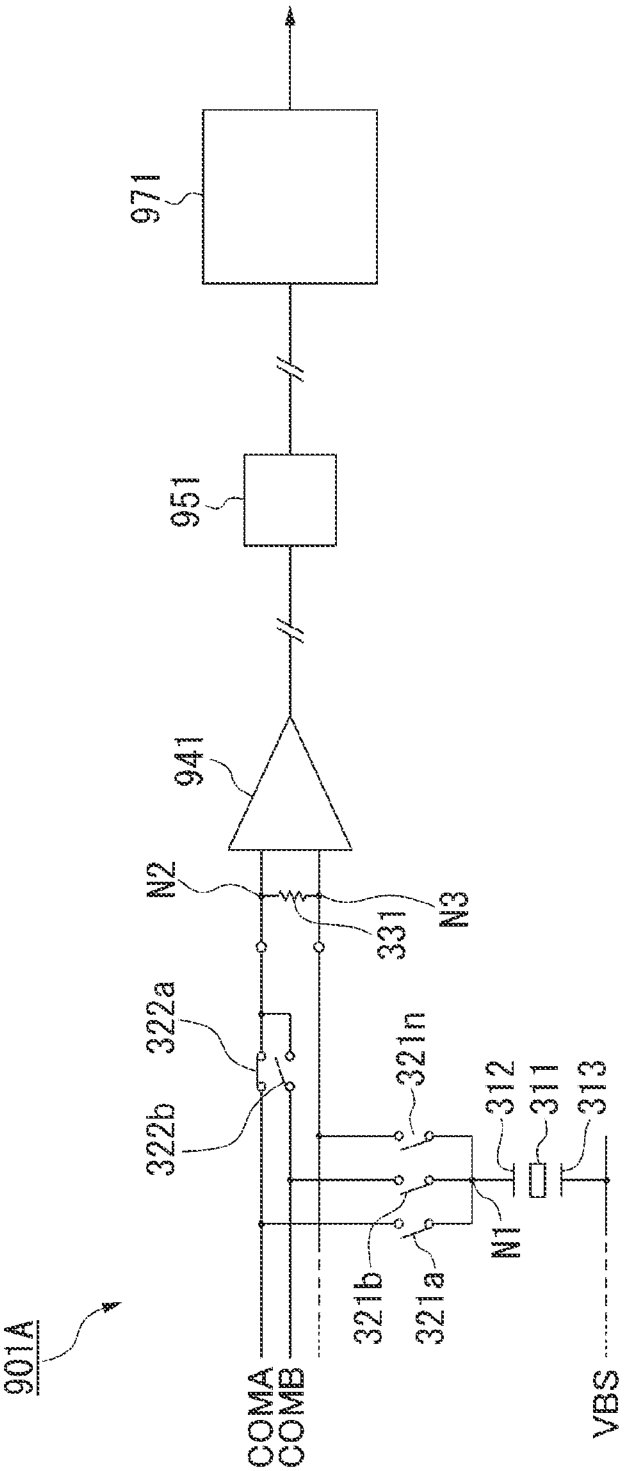
FIG. 10 is a diagram illustrating an example of a circuit of a head unit having a residual vibration detection unit of the related art.

Here, for the purpose of comparison with the head unit according to the present embodiment, with reference to FIG. 10, the configuration of a circuit of a head unit 901A of the related art will be described. The head unit 901A of the related art includes a residual vibration signal generation circuit, an amplifier 941, an AD converter 951, and an FPGA 971. When the head unit 901A of the related art illustrated in FIG. 10 is compared with the first head unit 301 illustrated in FIG. 7, the head unit 901A of the related art is different in that the head unit 901A of the related art includes the amplifier 941 in place of an analog differential residual vibration signal generation circuit.

In the head unit 901A of the related art, after the residual vibration signal, which is an analog signal, is amplified by the amplifier 941 mounted inside the head substrate, the residual vibration signal is input into the AD converter 951 by a single-end transmission system. Then, based on a signal that is digitized by the AD converter 951, the nozzle state is determined by the FPGA 971.

According to the configuration of the head unit 901A of the related art, the residual vibration signal is transmitted as an analog signal from the amplifier 941 to the AD converter 951. Here, the AD converter 951 is mounted on a driving circuit substrate. This is because an AD converter such as the AD converter 951 has a large circuit size and cannot be mounted inside the head substrate.

In a printing apparatus for industrial use, the distance from the head substrate to the driving circuit substrate may be great. Therefore, according to the configuration of the head unit 901A of the related art, the residual vibration signal, which is an analog signal, needs to be transmitted over a long distance from the amplifier 941 mounted on the head substrate to the AD converter 951 mounted on the driving circuit substrate by a single-end method. In a process of transmission from the amplifier 941 to the AD converter 951, noise is likely to be superimposed on the residual vibration signal, which is an analog signal, from a peripheral device. When noise is superimposed on the residual vibration signal, the AD converter performs digital processing with a waveform on which noise is superimposed. The waveform on which noise is superimposed may be largely different from the original residual vibration waveform. As a result, in the head unit 901A of the related art, the nozzle state may be falsely determined.

In addition, in recent years, in a substrate included in a liquid ejection apparatus, many semiconductor devices are aggregated near the head, and the density has been increased. On the other hand, in order to transmit the residual vibration signal, which is an analog signal, a wiring layout that improves the noise immunity needs to be employed. As a result, wiring distances of other signals are extended, or wiring layouts of other signals are made complicated, and the signal quality may be deteriorated.

On the other hand, in the head unit according to the present embodiment, since the noise immunity can be enhanced through differential transmission of the residual vibration signal, restrictions on the wiring layout of the substrate for transmitting the residual vibration signal can be mitigated, and the degree of freedom in wiring can be improved.

Although an embodiment of the disclosure has been described in detail with reference to the drawings thus far, specific configurations are not limited to the above-described configurations, and various design changes and the like can be made within a range not departing from the spirit of the disclosure.

What is claimed is:

1. A head unit comprising:

a piezoelectric element displaced according to a driving signal to cause a liquid to be ejected;

a driving signal generation unit that generates the driving signal;

a residual vibration signal generation circuit that outputs a change in an electromotive force of the piezoelectric element according to residual vibration, in a pressure chamber in communication with a nozzle, that occurs after supply of the driving signal, as a residual vibration signal;

an analog differential residual vibration signal generation circuit that converts the residual vibration signal into an analog differential residual vibration signal;

a demodulation circuit that demodulates the analog differential residual vibration signal and outputs a demodulated signal;

an AD converter that converts the demodulated signal into a digital signal; and a determination unit that determines, based on the digital signal, a state in the pressure chamber.

2. The head unit according to claim 1, wherein the analog differential residual vibration signal generation circuit is composed of a discrete component.

3. The head unit according to claim 1, wherein the analog differential residual vibration signal generation circuit is composed of an IC component.

4. The head unit according to claim 1, further comprising:

a first substrate on which the analog differential residual vibration signal generation circuit is mounted; and a second substrate on which the demodulation circuit is mounted, wherein the first substrate is different from the second substrate.

5. The head unit according to claim 4, wherein the AD converter is mounted on the second substrate.

6. The head unit according to claim 4, wherein the residual vibration signal generation circuit is mounted on the first substrate.

7. A liquid ejection apparatus comprising:

a transport mechanism; and a head unit, wherein the head unit includes a piezoelectric element displaced according to a driving signal to cause a liquid to be ejected, a driving signal generation unit that generates the driving signal, a residual vibration signal generation circuit that outputs a change in an electromotive force of the piezoelectric element according to residual vibration, in a pressure chamber in communication with a nozzle, that occurs after supply of the driving signal, as a residual vibration signal, an analog differential residual vibration signal generation circuit that converts the residual vibration signal into an analog differential residual vibration signal, a demodulation circuit that demodulates the analog differential residual vibration signal and outputs a demodulated signal, an AD converter that converts the demodulated signal into a digital signal, and a determination unit that determines, based on the digital signal, a state in the pressure chamber.

8. The liquid ejection apparatus according to claim 7, wherein the analog differential residual vibration signal generation circuit is composed of a discrete component.

9. The liquid ejection apparatus according to claim 7, wherein the analog differential residual vibration signal generation circuit is composed of an IC component.

10. The liquid ejection apparatus according to claim 7, further comprising:

a first substrate on which the analog differential residual vibration signal generation circuit is mounted; and a second substrate on which the demodulation circuit is mounted, wherein the first substrate is different from the second substrate.

11. The liquid ejection apparatus according to claim 10, wherein the AD converter is mounted on the second substrate.

12. The liquid ejection apparatus according to claim 10, wherein the residual vibration signal generation circuit is mounted on the first substrate.

* * * * *